2,787,631
Patented Apr. 2, 1957

2,787,631

CARBONATE PREPARATION

Henry C. Stevens, Akron, Ohio, assignor to Columbia-Southern Chemical Corporation, Allegheny County, Pa., a corporation of Delaware No Drawing. Application May 5, 1954,
Serial No. 427,885

6 Claims. (Cl. 260—463)

The present invention relates to diesters of carbonic acid and more particularly pertains to a novel, efficient process for preparing such carbonates from phosgene or other carbonyl halide and alcohols.

Diesters of carbonic acid may be prepared by reaction of an alcohol with a haloformate of an alcohol. Phosgenation of an alcohol will provide the haloformate. Thus, preparation of carbonates may be considered to involve two reactions represented by the following equations:

(1) 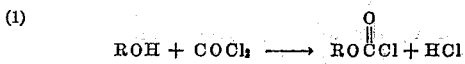

(2) 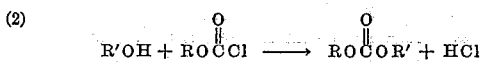

wherein ROH and R'OH represent alcohols.

The practices employed to conduct the reactions represented by the above two equations, prior to this invention, are subject to certain objections. For one thing, serious formation of undesirable by-product halides, notably chlorides is frequently encountered. In addition, very slow rates of reaction are observed. Still another objectionable feature of suggested procedures for consumating carbonate formation is the stepwise preparation of chloroformate and carbonate and consequent use of at least two independent reaction zones.

According to the present invention, direct preparation of carbonates from phosgene and alcohol may be effected in a unitary reaction zone without consequential formation of by-product halides such as chlorides of the alcohol. Also, enhanced reaction rates are made possible particularly under optimum conditions of this invention. It has now been discovered that one or more of these three advantages accrue when phosgene and an alcohol are reacted in a pool of chloroformate to provide diesters of carbonic acid.

In accordance with the present invention, phosgene or other carbonyl halides and a suitable alcohol, usually in essentially stoichiometric proportions, are incorporated in the pool of chloroformate or other haloformate at temperatures conducive to the formation of the diesters of carbonic acid. Apparently, a beneficiating influence is exerted by the presence of a haloformate, preferably a chloroformate of the incorporated alcohol.

It has further been discovered in accordance with a preferred embodiment of this invention that the concentration of haloformate in the pool has a bearing on the degree to which at least one of the beneficial effects of this invention is achieved, notably on the attainment of enhanced reaction rates and consequent rapidity with which the carbonate is formed. Thus, enhanced reaction rates may be achieved according to a preferred embodiment of this invention by establishing and maintaining a concentration of chloroformate in the reaction medium which is at least equal to that capable of being generated by the alcohol and phosgene which are present. Otherwise expressed, the pool of chloroformate should contain at least as much chloroformate on a mole basis as phosgene which is incorporated in the medium.

In the case of monohydric alcohol, the pool should preferably contain at least about 25 mole percent chloroformate based on the total quantities of phosgene and alcohol employed and the chloroformate present. When stoichiometric proportions of phosgene and a monohydric alcohol are incorporated in a pool of chloroformates, the mole concentration of chloroformate should be equivalent to the mole concentration of phosgene. Inasmuch as approximately two moles of monohydric alcohol per mole of carbonyl halide represents a stoichiometric proportion for these two reactants in the formation of carbonate diesters, a suitable initial reaction medium should contain at least about one mole of chloroformate, one mole of phosgene, and two moles of the monohydric alcohol. At least this concentration of chloroformate should be maintained substantially throughout the entire reaction period. At the conclusion of the reaction, a medium containing a mole concentration of chloroformate which is at least equivalent to the mole concentration of carbonate should preferably result.

Even higher concentrations of chloroformate are suitable. Those concentrations of chloroformate which at the end of the reaction provide between about 1 and 3 moles of chloroformate per mole of carbonate are recommended. Larger concentrations of chloroformate in the reaction medium are not normally employed for economic reasons, although they provide otherwise suitable conditions.

Temperatures which are conducive to the formation of the carbonate vary depending on the particular diester. However, the present invention is usually conducted by establishing a suitable reaction medium containing the requisite concentration of chloroformate and heating the medium. At the outset of the reaction, heat is not essential although in a typical procedure gentle heating is effective. As the reaction proceeds, the temperature of the reacting medium is raised, usually gradually, to facilitate the reaction rate. In a preferred procedure, the temperature of the reacting medium is ultimately raised to the point where the chloroformate is at its reflux temperature. This reflux temperature generally corresponds to about the normal boiling temperature of the chloroformate when approximately atmospheric pressures are present. Obviously, with superatmospheric or subatmospheric pressures this temperature will vary. It will of course be appreciated that various modifications of such procedure are possible within the scope of this invention.

As indicated, stoichiometric proportions of the phosgene and alcohol are incorporated in the chloroformate pool. With a monohydric alcohol approximately two moles of alcohol per mole of phosgene should be incorporated in the pool of chloroformate. Some latitude in the mole proportions of phosgene and alcohol that may be employed is permissible. Between about 1.7 and 2.3 moles of monohydric alcohol per mole of phosgene is a permissible range of proportion and may be considered for the purpose of this invention to represent essentially stoichiometric proportions of the two reactants.

A wide variety of techniques are available for establishing the desired reaction medium. One favored procedure is to add simultaneously stoichiometric or approximately stoichiometric proportions of phosgene and alcohol to a pool of chloroformate. This addition is usually accomplished over a relatively short period of time (in comparison with the entire reaction period) at the initial stages of the reaction. It is generally accomplished by independently charging streams of the respective reactants to a pool of chloroformate in about an hour. During such addition, external heating of the chloroformate pool is not essential, and sometimes purposely omitted. Of course, other satisfactory procedures for bringing the three essential components of the reaction medium together are available.

Subsequent to the conclusion of the carbonate formation, the reaction medium will normally contain at least about one mole of chloroformate per mole of carbonate ester. Recovery of the carbonate from such medium is accomplished by recourse to any of those expedients which permit resolution of these two materials. Simple fractional distillation of the chloroformate and carbonate mixture permits the separation of a major part and generally almost all of the chloroformate. A further fractional distillation of the carbonate from which a major portion of the chloroformate has already been removed by distillation or other equivalent procedure may be employed to further reduce the chloroformate content of the carbonate.

Many times, however, removal of the last traces of chloroformate from the carbonate is not readily achieved by fractional distillation or other physical separation techniques. Thus, when extremely pure carbonate is desired, other techniques are employed to remove the last traces of chloroformate. A suitable technique in this regard is described in U. S. Letters Patent 2,517,965. For example, the carbonate containing residual traces of the chloroformate may be treated with ammonia or ammonium compounds such as ammonium hydroxide, ammonium carbonate, ammonium bicarbonate, and the like which liberate ammonia. Still another technique for removing the final traces of chloroformate involves treating the carbonate with a tertiary amine such as triethanol amine, notably by heating.

Besides phosgene, other known carbonyl halides such as carbonyl bromide are useful. Phosgene, however, is most commonly employed and preferred. Usually, phosgene in the gaseous state is introduced into the pool of chloroformate, although liquid phosgene is operative. In the case of liquid phosgene its cooling effect must be considered and generally counter-balanced by appropriate external heating of the reaction medium.

Depending on the particular reactants, various haloformates are operable. As a practical matter the haloformate corresponding to the carbonyl halide is utilized and thus chloroformates are employed when phosgene is the carbonyl halide. Also, the chloroformate of the alcoholic reactant should preferably comprise the pool of chloroformate. This is especially true when unmixed carbonates are desired. For example, in the production of diethyl carbonate the alcoholic reactant is ethanol and the preferred chloroformate is ethyl chloroformate.

The invention is admirably suited to the production of aliphatic diesters of carbonic acid and particularly the dialkyl esters of carbonic acid, e. g. dimethyl carbonate, diethyl carbonate, diisopropyl carbonate, dibutyl carbonates, etc. Those diesters which are normally liquids are provided with exceptional satisfaction. Saturated aliphatic monohydric alcohols, preferably those containing from 1 to 7 carbon atoms such as methanol, ethanol, isopropanol, propanol, the butanols, and higher molecular weight saturated aliphatic monohydric alcohols are used. Corresponding halogen substituted alcohols among which are 2-chloroethanol, 3-chloropropanol, etc. also are reactive. However, other monohydric alcohols capable of forming haloformates including unsaturated alcohols such as allyl, methallyl, crotyl, isocrotyl, cinnamyl, propargyl, tiglyl, or methyl vinyl carbonyl alcohols, citronellol, geraniol, and the higher molecular weight alcohols including oleyl and linoleyl alcohols as well as substituted alcohols such as 2-chloroallyl, 2-bromoallyl, chlorocrotyl alcohol, 3-chlorobutene 2-ol-1, or other halogen substituted alcohols are included. By employing a mixture of two or more alcohols, mixed esters are prepared. For example, if methanol and ethanol are used simultaneously methyl-ethyl carbonate may be provided.

The following examples illustrate the manner in which the present invention may be practiced:

Example I

In a 4-necked glass flask fitted with thermometer, gas inlet tube, dropping funnel and Dry Ice-acetone cold finger was placed 94.5 grams of methyl chloroformate. The flask was then placed on a steam bath and heated to reflux whereafter heating was discontinued and 32.0 grams (1.0 mole) of methanol and 49.5 grams (0.50 mole) of gaseous phosgene were introduced through the funnel and inlet tube respectively over a period of 50 minutes. Toward the end of the addition period the reaction temperature dropped to 42° C. Refluxing was started and continued for 2 hours with heat being applied in the latter portion of the 2 hour period. At the end of the 2 hour period the reaction temperature had reached 65° C. At this time the Dry Ice-acetone cold finger was replaced with a water condenser through which a Dry Ice trap was attached. An additional half hour of further vigorous refluxing brought the reaction temperature to 70° C. Thereafter, the resulting reaction medium was distilled through a column and a yield of dimethyl carbonate of 42.8 grams or 95% of theoretical was obtained. About 99% of the unreacted methyl chloroformate was recovered.

Example II

Methyl chloroformate for use in the reaction medium was prepared by the following procedure. To a pool of phosgene in a jacketed kettle equipped with a reflux condenser was added 0.92 pound moles of methanol and phosgene at a rate such that the reaction temperature of the pool was maintained at between 20° to 30° C. without external cooling of the reaction container by refluxing of phosgene. The chloroformate thusly prepared was heat degassed to 65° C. by charging hot water to the kettle jacket.

When the chloroformate had cooled to 60° C., 0.92 pound moles of methanol and 0.46 pound moles of phosgene were added simultaneously to the chloroformate. The mixture was then heated to the boiling point of the chloroformate, approximately 70° C., with the reflux condenser operating at maximum cooling. The resulting solution was withdrawn from the kettle and distilled to recover purified dimethyl carbonate. Run 1 in Table I summarizes the results and conditions of this reaction.

The above procedure for preparing dimethyl carbonate was followed a plurality of times. The data is tabulated in Table I below:

| Run No. | Size, Lb. Mols | Alcohol, Lbs. | COCl$_2$, Lbs. | Methyl Chloroformate, Lbs. | Reaction Temp., ° C. | Heating Time, Hrs. | Max. Temp., ° C. |
|---|---|---|---|---|---|---|---|
| 1 | 0.46 | 29.44 | 44.5 | 87.0 | 60–56 | 5.0 | 71 |
| 2 | 0.46 | 29.44 | 44.5 | 87.0 | 56–39 | 6.0 | 72 |
| 3 [a] | 0.46 | 29.44 | 44.5 | 71.1 | 69–43.5 | 8.5 | 71.5 |
| 4 [b] | 0.46 | 29.44 | 44.5 | 71.7 | 66–49 | 12.0 | 73 |
| 5 | 0.50 | 32.0 | 49.5 | 94.5 | 64–51.5 | 9.3 | 72 |

[a] The methyl chloroformate used was recovered by distillation in run 1
[b] Methyl chloroformate used was recovered by distillation in run 2.

While the invention has heretofore been described with reference to batch-type procedures it will be appreciated that the process herein contemplated may be performed in a continuous or semi-continuous manner. For example, a continuous process within the scope of this invention may be conducted by feeding the alcohol and phosgene to a reactor containing refluxing chloroformate and overflowing the reaction mixture into a suitable container such as a retention tank. At proper intervals, or continually, the overflow may be fractionally distilled to recover the carbonate and also separate the chloroformate. Recycling of this separated chloroformate, possibly even containing some methyl carbonate, to the refluxing chloroformate pool in the reaction zone is possible.

I claim:

1. A method of preparing a diester of carbonic acid by reaction of a carbonyl halide and an alcohol which comprises conducting the reaction in a liquid medium of a haloformate containing the reactants in essentially the stoichiometric proportions necessary for formation of the diester and during the latter portion of the reaction maintaining the medium at approximately the boiling temperature of the haloformate.

2. A method of preparing a diester of carbonic acid by reaction of phosgene and an alcohol which comprises conducting the reaction in a liquid medium of the chloroformate of said alcohol containing the reactants in essentially the stoichiometric proportions necessary for formation of the diester and during the latter portion of the reaction maintaining the medium at approximately the boiling temperature of the chloroformate.

3. A method of preparing a diester of carbonic acid by reaction of phosgene and an alcohol which comprises conducting the reaction in a liquid medium of the chloroformate of the alcohol containing the reactants in essentially the stoichiometric proportions necessary for formation of the diester, said medium containing at least 25 mole percent chloroformate and during the latter portion of the reaction maintaining the medium at approximately the boiling temperature of the chloroformate.

4. A method of preparing a diester of carbonic acid by reaction of phosgene and an aliphatic alcohol which comprises conducting the reaction in a liquid medium of the chloroformate of said alcohol, said medium containing approximately stoichiometric quantities of phosgene and aliphatic alcohol necessary for formation of the diester, the concentration of chloroformate in the reaction medium being at least 25 mole percent throughout substantially the entire reaction and during at least the latter portion of the reaction maintaining the medium at approximately the boiling temperature of the chloroformate.

5. A method of preparing dimethyl carbonate by reaction of phosgene and methanol which comprises conducting the reaction in a liquid medium of methyl chloroformate containing methanol and phosgene in the ratio of approximately two moles of methanol per mole of phosgene and during at least the latter portion of the reaction maintaining the medium at approximately the boiling temperature of methyl chloroformate.

6. A method of preparing diethyl carbonate by reaction of phosgene and ethyl alcohol which comprises conducting the reaction in a liquid medium of ethyl chloroformate containing the reactants in the ratio of approximately two moles of ethyl alcohol per mole of phosgene, the concentration of ethyl chloroformate in said medium being at least 25 moles percent throughout substantially the entire reaction and during at least the latter portion of the reaction maintaining the medium at approximately the boiling temperature of ethyl chloroformate.

References Cited in the file of this patent

UNITED STATES PATENTS

| | | |
|---|---|---|
| 2,337,172 | Wojcik | Dec. 21, 1943 |
| 2,390,551 | Muskat et al. | Dec. 11, 1945 |
| 2,476,637 | Strain et al. | July 19, 1949 |